Figure 1:
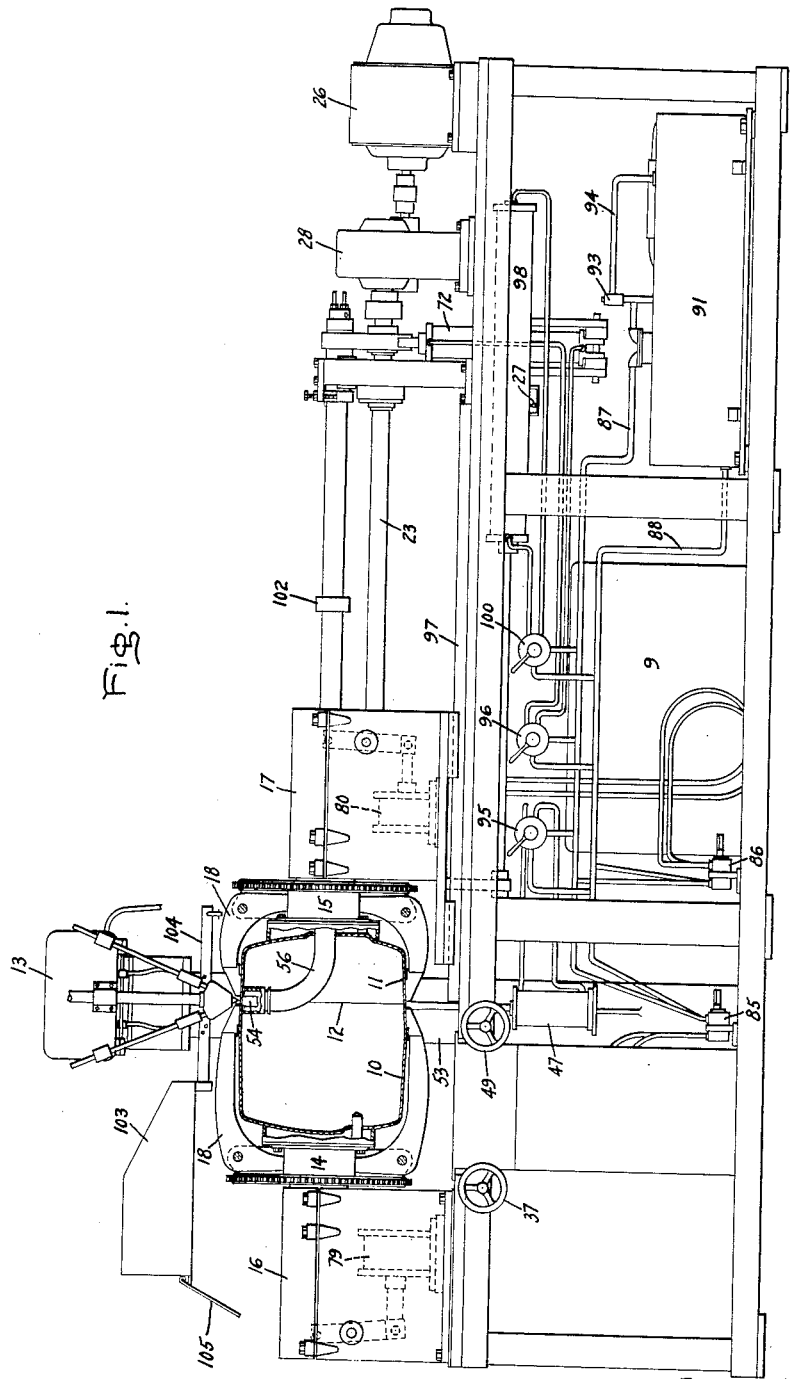

Inventors:
James T. Catlett,
Verni J. Chapman.
by Harry E. Dunham
Their Attorney.

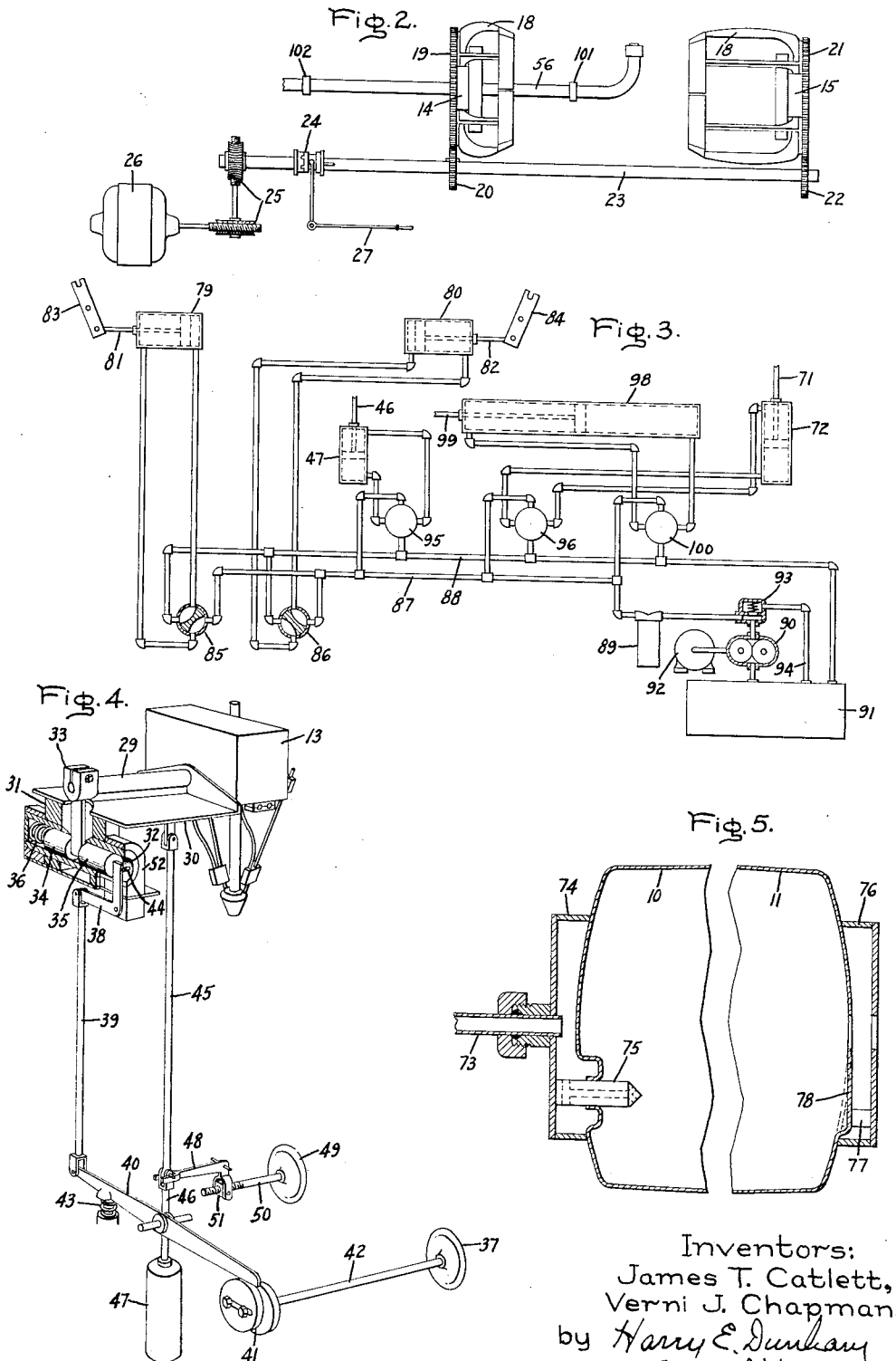

Aug. 31, 1937.  J. T. CATLETT ET AL  2,091,307
WELDING MACHINE
Filed Oct. 19, 1935    3 Sheets-Sheet 3
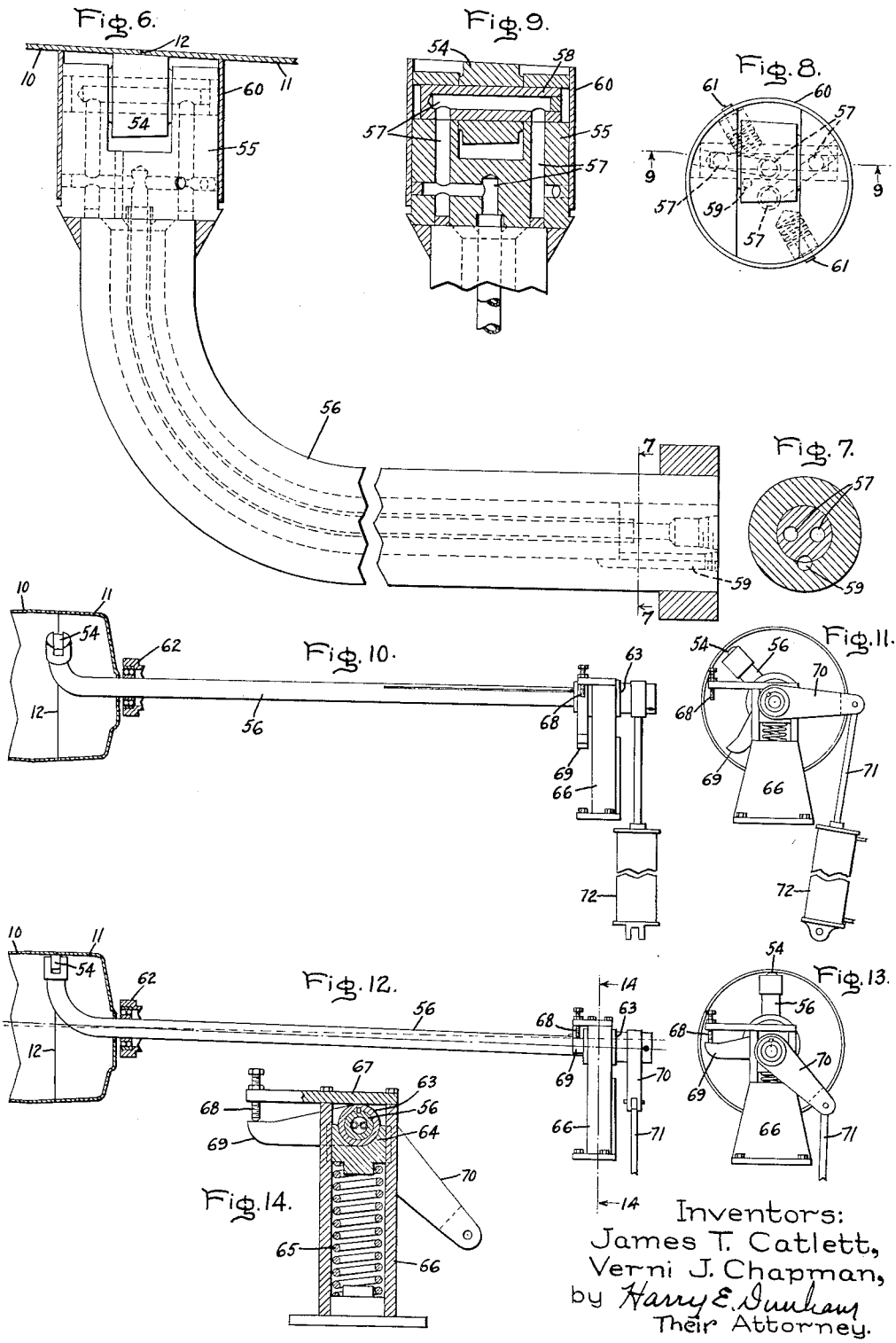
Inventors:
James T. Catlett,
Verni J. Chapman,
by Harry E. Dunham
Their Attorney.

Patented Aug. 31, 1937

2,091,307

UNITED STATES PATENT OFFICE 2,091,307

WELDING MACHINE

James T. Catlett, Scotia, and Verni J. Chapman, Schenectady, N. Y., assignors to General Electric Company, a corporation of New York Application October 19, 1935, Serial No. 45,752

18 Claims. (Cl. 113—59)

Our invention relates to welding machines.

It is an object of our invention to provide an arc welding machine for fabricating substantially closed vessels by welding together the complementary parts thereof.

It is a further object of our invention to provide a machine in which the work is held and welded while the seam is supported by a weld backing member which is forced into engagement with the work during welding from a position to which.it is biased away from the work to facilitate the loading and unloading of the work in the machine.

It is a further object of our invention to provide means for supplying a gaseous medium to the undersurface of the work parts being welded.

Further objects of our invention will become apparent from a consideration of the following description of the embodiment of our invention illustrated in the accompanying drawings.

Fig. 1 of the drawings is a front view of a machine embodying our invention which is used for welding metallic liners for beer barrels; Fig. 2 is a view illustrating the driving connection for the chucks in which the complementary parts of the beer barrel are supported; Fig. 3 is a diagrammatic representation of the fluid operating mechanisms for actuating various parts of the machine; Fig. 4 is a view illustrating the manner in which the welding head is supported; Fig. 5 is a view illustrating the indexing mechanism forming part of the work holder as well as the means for supplying gas to the interior of the vessel being welded; Fig. 6 is a view showing the construction of the backing-up member and its supporting shaft; Fig. 7 is a section along lines 7—7 of Fig. 6; Fig. 8 is a top view of the backing member and its supporting structure; Fig. 9 is a sectional view along lines 9—9 of Fig. 8; Figs. 10, 11, 12, and 13 are views illustrating the shaft upon which the backing member is supported and the mechanism for tilting and rotating said shaft to move it and the backing member supported thereon to positions facilitating the loading and unloading of the machine and to a position in which the backing member is positioned under the welding agency during welding; and Fig. 14 is a sectional view along lines 14—14 of Fig. 12.

In the machine illustrated in the drawings the complementary parts 10 and 11 of a beer barrel liner are supported in work holders with the seam 12 between the parts positioned beneath a welding agency 13. The work holders illustrated are chucks 14 and 15 supported for rotation in bearings in the head stock 16 and the tail stock 17 of the machine. It is to be noted that the clamping arms 18 of the chucks engage the parts 10 and 11 at points closely adjacent the seam 12. As shown in Fig. 2, which is a back view of a part of the machine illustrated in Fig. 1, the chucks 14 and 15 are simultaneously rotated by being connected through gears 19, 20 and 21, 22 to a countershaft 23 which is connected through a clutch 24 and gearing 25 to a motor 26. The clutch 24 is operated through the agency of a lever 27 which is available to the operator at the front of the machine. As shown in Fig. 1, the gearing 25 is enclosed in a casing 28. The position of the operating lever 27 for the clutch 24 is also illustrated in this figure.

The welding agency 13 may be of any suitable type but as illustrated in the drawings comprises a head of the construction illustrated, described and claimed in United States Letters Patent 1,946,305, James T. Catlett, February 6, 1934, for Welding apparatus, assigned to the assignee of the present invention. The control for the welding head is indicated at 9 in Fig. 1.

The welding head 13 is supported on the projecting end of a shaft 29 supported for rotation on one arm 30 of a bracket, the other arm 31 of which is supported for rotation on a hollow shaft 32. An arm 33 attached to the shaft 29 extends through a side wall opening in the hollow shaft 32 and is located between cylindrical blocks 34 and 35 positioned in the hollow shaft. One block, 34, is biased into engagement with the arm 33 by a spring 36 which, acting through block 34 on the arm 33, tends to rotate the shaft 29 in one direction. The rotational adjustmer.: of the welding head 13 on the shaft 29 is controlled by the position of block 35 in the hollow shaft 32. This block may be moved to adjusted positions within the shaft 32 through the agency of a linkage terminating in a handwheel 37 at the front of the machine. This linkage comprises a bell crank lever 38, a rod 39, a lever 40, a cam mechanism 41, and a shaft 42. The levers 38 and 40 are pivotally supported in the frame of the machine and one end of the lever 40 is held in engagement with the cam mechanism by a spring 43 acting against the other end of this lever. The cam mechanism comprises two circular members which are adjustable relatively to one another to secure an offset giving the desired range of adjustment for moving the welding head 13 across the seam 12 between the complementary parts 10 and 11 of the vessel supported in the machine. It will be noted that the spring 36 acting on the block 34 is enclosed within the hollow shaft 32 and that a stop 44, also within the hollow shaft 32, is provided for limiting the movement of the blocks and lever 38 in the shaft under the action of the spring 36.

The welding head may be moved from its operating position illustrated in Fig. 1 to an inoperative position in which it is removed a substantial distance from the work by tilting the bracket 30—31 about the axis of the hollow shaft 32. The mechanism employed for this purpose comprises a rod 45, one end of which is connected to arm 30 of the bracket and the other end of which is connected to a piston rod 46 which is moved in and out of a cylinder 47. This cylinder forms part of the fluid operating mechanisms diagrammatically represented in Fig. 3, which will be more fully described below. The operating position of the welding head is determined by an adjustable stop. This stop comprises a bell crank lever 48 which is pivotally supported in the machine and has one end upon which an enlarged portion of the connection to the bracket 30—31 rests when the operating fluid has been exhausted from cylinder 47. The position of the bell crank lever 48 is determined by a hand wheel 49 which is connected to one end of shaft 50, the other end of which is threaded for a nut 51 supported in the other arm of the bell crank lever 48. From the construction described, it is apparent that the vertical adjustment of the welding head over the seam between the work parts is determined by the adjustment of the hand wheel 49.

In the machine illustrated, the hollow shaft 32 is supported in bearings 52 on the top end of a column 53 which is also shaped to provide a support for the cylinder 47. The column 53 in the machine illustrated forms an integral part of the frame of the machine.

The manner of supporting the welding head which provides for adjusting the welding agency across the seam and vertically thereto, forms the subject matter of an application, Serial No. 45,753, of one of us, James T. Catlett, filed concurrently herewith for Welding apparatus, and assigned to the assignee of the present invention.

During welding, the seam 12 is backed by a member 54 which is supported for rotation in a yoke 55 attached to the end of the curved end portion of a shaft 56. As shown in Figs. 6, 7, 8, and 9, conduits 57 are provided in the shaft 56, the yoke 55 and the axle 58 for the backing member 54, through which a medium may be circulated for cooling the backing member 54. A conduit 59 is also provided in the shaft 56 for supplying a gaseous medium about the backing member 54 and the portions of the work parts 10 and 11 immediately adjacent the seam where the welding operation is being performed. The supply of gaseous medium is somewhat confined to the inside surface of the vessel at the point of welding by means of a collar 60 supported on the yoke 55 in which the backing member is supported. As shown in Fig. 6, this collar engages the work parts and forms a chamber within which the gas is more or less confined. The collar 60 is held in position on the yoke 55 by spring biased pins 61.

As shown in Figs. 10 to 14, inclusive, the shaft 56 is supported for rotation about its longitudinal axis by means of which its curved end portion is moved to predetermined positions and for a tilting motion by means of which backing member 54 supported on its curved end portion is brought into engagement with the work parts. One end of the shaft 56 is supported in a self-adjusting or tiltable bearing 62 located in the axis of rotation of the chuck 15. The other end of the shaft 56 is supported in a sleeve 63 which, in turn, is supported in a bearing 64. Shaft 56 and sleeve 63 are keyed together so that a rotational movement imparted to the sleeve 63 is also imparted to the shaft 56. The shaft 56 is longitudinally movable in the bearing 62 and the sleeve 63.

The bearing 64 for the sleeve 63 is biased to a position in the axis of rotation of the work supports by means of a spring 65 located in the pedestal 66 for the bearing 64. Its biased position is determined by a stop 67 on the pedestal 66 which also acts as a support for an adjustable stop 68 which for one rotational adjustment of the sleeve 63 and bearing 64 engages an arm 69 on the sleeve. The sleeve 63 is rotated in its bearing 64 through the agency of an arm 70 which is connected to the piston rod 71 of a cylinder 72 forming part of the fluid operating mechanisms of the machine. The position of the arms 69 and 70 on the sleeve 63 is such that an initial rotation may be imparted to the shaft 56 before the arm 69 engages the adjustable stop 68. The stop 68 is so adjusted as to position the backing member 54 beneath the welding agency at the termination of this rotational adjustment. Further movement of the arm 70 through the agency of rod 71 and cylinder 72 depresses the bearing 64 from its biased position and tilts the shaft 56 to force the backing member 54 into engagement with the work.

As has been noted in the description above, a gaseous medium is supplied about the backing member 54 and the adjacent work parts with which it makes engagement during welding. In the particular machine illustrated, the welding agency is an atomic hydrogen torch and the gas supplied about the backing member is hydrogen, which is a combustible gas. It has been found by experience that if a combustion supporting gas is not continuously supplied to a substantially closed vessel being welded there is constant danger that explosions will occur during welding. To overcome this difficulty, means have been provided for supplying a combustion supporting gas to the interior of the vessel. As shown in Fig. 5, this means comprises a conduit 73 which extends through the axis of rotation of the chuck 14 and terminates in an indexing device 74 engaging the end portion of the part 10 of the vessel. The indexing device 74 is provided with a pin 75 having an opening therethrough communicating with the chamber formed by the indexing device and the end wall of the part 10 of the vessel. The pin 75 enters an opening in the part 10 and thus holds it in a predetermined position relative to the indexing device 74 of which it forms a part. The other part 11 of the vessel is supported in an indexing device 76 provided with a part 77 which fits over a projecting part 78 of part 11 and serves to hold it in a predetermined position relative thereto. Since the indexing devices 74 and 76 have predetermined positions in the chucks 14 and 15, which are positively geared together, the work parts 10 and 11 will thus be positioned accurately with respect to one another in the positions they are to assume in the finished article after it has been welded. It will be apparent of course that the nature of the indexing devices will depend upon the articles being welded and will be modified to satisfy the conditions presented by various work parts.

The apparatus disclosed for supplying a combustion supporting gas to a substantially closed vessel to which a combustible gas is supplied against the inside of the vessel opposite the welding agency, forms the subject matter of the above referred to application, Serial No. 45,753, of James T. Catlett.

The various parts of the machine are controlled by fluid operated mechanisms diagrammatically represented in Fig. 3. Certain of these mechanisms have already been referred to.

As shown in Figs. 1 and 3, the chucks 14 and 15 are operated by the admission of fluid to the opposite ends of the cylinders 79 and 80 located respectively in the head stock 16 and tail stock 17 of the machine. The admission and exhaust of fluid to and from these cylinders moves the pistons and rods 81 and 82 in and out of the cylinders to operate levers 83 and 84, which are connected through a linkage to the arms 18 of the chucks 14 and 15. The admission and exhaust of fluid to and from cylinders 79 and 80 is controlled by pedal operated valves 85 and 86 which control the supply of fluid under pressure from conduit 87, and the exhaust of fluid from these cylinders to the exhaust conduit 88. Fluid is supplied under pressure to conduit 87 through a strainer 89 by a pump 90, the intake for which is connected to the source of supply in tank 91. The pump 90 is driven by a motor 92. The pressure in the conduit 87 is controlled by a relief valve 93, which exhausts back into the container 91 through a conduit 94. The exhaust conduit 88 also empties into the container 91.

The tilting of the welding head 13 is controlled through the agency of cylinder 47 and its piston and piston rod 46, as described above. The ends of the cylinder 47 are connected through a hand valve 95 with the pressure and exhaust conduits 87 and 88. The rotation and tilting of the shaft 56 upon which backing member 45 is supported is under the control of a cylinder 72, the piston and piston rod 71 of which is connected to the arm 70 as previously described. The ends of cylinder 72 are cnnected through a hand valve 96 to the pressure and exhaust conduits 87 and 88.

The tail stock 17 is moved along ways 97 (Fig. 1) through the agency of a cylinder 98, whose piston and piston rod 99 is connected to the tail stock. Fluid is admitted to and exhausted from the cylinder 98 through a hand valve 100, which is connected to the pressure and exhaust conduits 87 and 88. As shown in Figs. 1 and 2, the shaft 56 is provided with collars 101 and 102 which engage the tail stock 17 and move the shaft 56 to predetermined positions facilitating the loading and unloading of the work parts in the machine as well as positioning the backing member 54 beneath the seam when the parts of the vessel are clamped in the machine in a position for welding.

A shield 103 is supported on a bar 104 attached to the column 53 of the welding machine in a position such that the shield 103 may be swung into a position enclosing the welding agency to shield the operator from the effects of its heat when over the work or tilted away therefrom. When the shield is in position about the welding agency, the operator may view the welding operation through a screen 105.

After a welding operation has been completed, the work may be removed from the machine in the following manner:

By operating valve 95, the welding head 13 is tilted away from the work. Thereafter, by operating valve 96, the shaft 56 is rotated from the position illustrated in Fig. 1 to a position in which the curved end portion points directly forward. The head stock chuck is then released by operating valve 85 and the tail stock 17 is moved to the right by operating valve 100. The work is then released from the tail stock chuck by operating valve 86 and the work then lifted from the machine by turning and moving it along the curved end portion of the shaft 56.

The loading operation may be performed in the following manner:

The work part 10 is secured in the head stock chuck by operating valve 85 and the part 11 is secured in the tail stock chuck by operating valve 86. These parts are then brought into abutting relationship as shown in Fig. 1 by operating valve 100 which moves the tail stock 17 toward the head stock 16. By operating valve 96, the shaft 56 is turned until the backing member 15 engages the work at the seam between the parts in the position illustrated in Fig. 1. Then by operating valve 95, the welding head 13 is lowered into the position illustrated in Fig. 1. The welding operation may then proceed with proper adjustments of the welding agency relative to the seam through the operation of handwheels 37 and 49.

From what has been stated above, it is apparent that the seam 12 is forcibly backed by the member 54 during welding due to the tilting of the shaft 56 through the agency of the mechanism illustrated in Figs. 10 to 14, inclusive. It is also apparent that the position of the welding head relative to the seam can be determined by adjusting the handwheels 37 and 49. The handwheel 37 provides a cross adjustment and the handwheel 49 provides a vertical adjustment.

The supply of gaseous medium to the inside of the vessel at the point of welding is of distinct advantage in that it prevents scaling and provides a smooth weld on the interior of the vessel. In welding a beer barrel formed of stainless steel, the shielding gas prevents scaling and greatly improves the surface characteristics of the weld on the inside of the vessel. It is of course to be understood that if the shielding gas is combustible, the operator also supplies through the mechanism above described a combustion supporting gas to the interior of the vessel. This combustion supporting gas may be air under pressure, the flow of which is controlled by a valve in the conduit 73.

Various modifications may be made in the machine illustrated without departing from our invention. It is of course apparent that certain features of our invention are of general application to the art of welding. It is also apparent that the welding agency may be a gas torch or an arcing electrode instead of the gas arc torch employed in the embodiment above described. The nature and construction of the chucks may be modified, depending upon the article being welded. Furthermore, the arrangement of the backing member on its supporting shaft may be varied to satisfy various conditions encountered and determined by the nature of the article being welded. These and other modifications will be apparent to those skilled in the art in view of the particular embodiment of our invention above described. Our invention is consequently not to be limited to the embodiment illustrated and described.

What we claim as new and desire to secure by Letters Patent of the United States is :

1. Welding apparatus comprising a support for the work to be welded, means for rotating said work support, a shaft extending through said work support, a weld backing member on said shaft, means for biasing said shaft to a position in which said backing member is out of engagement with the work in said work support, and means acting on said shaft for forcing said backing member into engagement with the work in said work support.

2. Welding apparatus comprising a support for the work to be welded, means for rotating said work support, a shaft extending through said work support, a weld backing member on said shaft, means for biasing said shaft to a position in which said backing member is out of engagement with the work in said work support, and means for tilting said shaft and forcing said backing member into engagement with the work in said work support.

3. Welding apparatus comprising a support for the work to be welded, means for rotating said work support, a weld backing member, a shaft on which said backing member is supported, means in the axis of rotation of said work support for tiltably supporting said shaft, means for biasing said shaft to a position in which said backing member is out of engagement with the work in said work support, and means for tilting said shaft and forcing said backing member into engagement with the work in said work support.

4. Welding apparatus comprising a support for the work to be welded, means for rotating said work support, a shaft extending through the center of rotation of said work support, a weld backing member on said shaft, means for biasing said shaft to a position in which said backing member is out of engagement with the work in said work support, and means for tilting said shaft about an axis in the center of rotation of said work support and for forcing said backing member into engagement with the work in said work support.

5. Welding apparatus comprising a support for the work to be welded, means for rotating said work support, a bearing tiltably supported in the axis of rotation of said work support, a shaft in said bearing, a weld backing member on said shaft, means for biasing said shaft to a position in which said backing member is out of engagement with the work in said work support, and means for tilting said shaft and said bearing and for forcing such backing member into engagement with the work in said work support.

6. Welding apparatus comprising a support for the work to be welded, means for rotating said work support, a tiltable bearing located in the axis of rotation of said work support, a shaft supported for longitudinal movement in said bearing, a weld backing member on said shaft, means for biasing said shaft to a position in which said backing member is out of engagement with the work in said work support, means for tilting said shaft and bearing and for forcing said backing member into engagement with work in said work support, and means for moving said work support and shaft relatively to one another.

7. Welding apparatus comprising a support for the work to be welded, means for rotating said work support, a tiltable bearing in the axis of rotation of said work support, a shaft supported in said bearing and having a curved end portion turned toward the work in said work support, a weld backing member on said curved end portion, means for rotating said shaft in said bearing, and means for tilting said shaft and bearing and forcing said backing member into engagement with the work in said work support.

8. Welding apparatus comprising a support for the work to be welded, means for rotating said work support, a tiltable bearing in the axis of rotation of said work support, a shaft supported in said bearing and having a curved end portion turned toward the work in said work support, a weld backing member supported on said curved end portion, and means acting on said shaft for first imparting rotation thereto by means of which said backing member is positioned beneath the agency used for welding and then tilting said shaft and forcing said backing member into engagement with the work in said work support.

9. Welding apparatus comprising a support for the work to be welded, means for rotating said work support, a shaft extending through said work support and having a curved end portion on the work supporting side of said work support, a weld backing member supported on the end of the curved portion of said shaft, means on the side of said work support opposite the work supporting side thereof for rotating said shaft to a plurality of predetermined positions in one of which said backing member is positioned beneath the agency used for welding, and means co-operating with said rotating means for tilting said shaft and forcing said backing member into engagement with the work in said work support when said backing member is positioned beneath said welding agency.

10. Welding apparatus comprising a support for the work to be welded, means for rotating said work support, a tiltable bearing in the axis of rotation of said work support, a bearing biased to a position in the axis of rotation of said work support, a shaft supported in said bearings and having a curved end portion turned toward the work in said work support, a weld backing member supported on the end of said curved end portion, means for limiting the rotation of said shaft to a position wherein said backing member is located beneath the agency used for welding, and means for imparting rotation to said shaft until said limiting means becomes effective and thereafter displacing said second mentioned bearing from its biased position, tilting said shaft and forcing said backing member into engagement with the work.

11. Welding apparatus comprising a support for the work to be welded, means for rotating said work support, a tiltable bearing in the axis of rotation of said work support, a bearing biased to a position in the axis of rotation of said work support, a sleeve supported in said last mentioned bearing, a shaft rotatable with said sleeve and supported for longitudinal movement in said tiltable bearing and said sleeve, said shaft having a curved end portion turned toward the work in said work support, a backing member supported on the curved end portion of said shaft, means for rotating said sleeve and the shaft supported therein, and means for limiting the rotation of said sleeve and shaft to a position wherein said backing member is located beneath the agency used for welding and for moving said sleeve and the bearing therefor against the bias imparted to said bearing to tilt said shaft and force said backing member into engagement with the work.

12. Welding apparatus comprising work supporting chucks mounted for rotation about a common axis, means for operating said chucks to open and work holding positions, means for imparting rotation to at least one of said chucks, a tiltable bearing in one of said chucks axially aligned with the axis of rotation of said chucks, a bearing biased to a position in the axis of rotation of said chucks, a sleeve supported in said last mentioned bearing, a shaft rotatable with said sleeve and supported from longitudinal movement in said tiltable bearing and said sleeve, said shaft having a curved end portion located between said chucks, a backing member supported on the end of the curved portion of said shaft, means for moving said chucks toward and away from one another, means responsive to the relative movement of said chucks for moving said shaft longitudinally to predetermined positions relative to said chucks, means for rotating said sleeve and the shaft supported therein to predetermined position in one of which said backing member is positioned beneath the agency used for welding, and means co-operating with said rotating means when said backing member is positioned beneath the welding agency for moving said sleeve and the bearing therefor from its biased position, tilting said shaft and forcing said backing member into engagement with the work in said chucks.

13. Welding apparatus comprising a weld backing member, means for positioning said backing member against the work surface opposite the work surface against which the welding agency is directed, and means for supplying a shielding gas about said backing member and the work surface in engagement with said backing member.

14. Welding apparatus comprising a welding agency, means for traversing a plurality of work parts and said welding agency relatively to one another along the seam between said parts, a weld backing member, means for positioning said backing member against the surfaces of the work parts opposite the surfaces of the work parts against which said welding agency is directed, and means for supplying a gaseous medium about said backing member and the work surfaces adjacent thereto.

15. Welding apparatus comprising a support for the work to be welded, means for rotating said work support, a weld backing member, a shaft on which said backing member is supported, means for tiltably supporting said shaft, means for tilting said shaft and forcing said backing member into engagement with the work in said work support, and means comprising a conduit in said shaft for supplying a gaseous medium about said backing member and the work adjacent thereto.

16. Welding apparatus comprising work supporting chucks mounted for rotation about a common axis, means for operating said chucks to open and work holding positions, means for imparting rotation to at least one of said chucks, a tiltable bearing in one of said chucks axially aligned with the axis of rotation of said chucks, a bearing biased to a position in the axis of rotation of said chucks, a sleeve supported in said last mentioned bearing, a shaft rotatable with said sleeve and supported from longitudinal movement in said tiltable bearing and said sleeve, said shaft having a curved end portion located between said chucks, a backing member supported on the end of the curved portion of said shaft, means for moving said chucks toward and away from one another, means responsive to the relative movement of said chucks for moving said shaft longitudinally to predetermined positions relative to said chucks, means for rotating said sleeve and the shaft supported therein to predetermined positions in one of which said backing member is positioned beneath the agency used for welding, means co-operating with said rotating means when said backing member is positioned beneath the welding agency for moving said sleeve and the bearing therefor from its biased position, tilting said shaft and forcing said backing member into engagement with the work, and means including a conduit in said shaft for supplying a gaseous medium about said backing member and the work adjacent thereto.

17. Apparatus for fabricating substantially closed vessels by welding together complementary parts comprising chucks for supporting said complementary parts for rotation about a common axis, means for operating said chucks to open and work holding positions, means for imparting rotation to at least one of said chucks, a tiltable bearing in one of said chucks axially aligned with the axis of rotation of said chucks, a bearing biased to a position in the axis of rotation of said chucks, a sleeve supported in said last mentioned bearing, a shaft rotatable with said sleeve and supported for longitudinal movement in said tiltable bearing and said sleeve, said shaft having a curved end portion located between said chucks, a backing member supported on the end of the curved portion of said shaft, means for moving said chucks toward and away from one another, means responsive to the relative movement of said chucks for moving said shaft longitudinally to predetermined positions relative to said chucks, means for rotating said sleeve and the shaft supported therein to predetermined positions in one of which said backing member is positioned beneath the agency used for welding, means co-operating with said rotating means when said backing member is positioned beneath the welding agency for moving said sleeve and the bearing therefor from its biased position, tilting said shaft, and forcing said backing member into engagement with the work, means for supplying a combustible gaseous medium through said shaft to the work adjacent said backing means, and means for supplying a combustion supporting gas to the interior of said vessel.

18. Welding apparatus comprising a welding head, shafts spaced from and extending at right angles to one another, one of said shafts being hollow having a side wall opening therein and serving as a support for the other shaft on which said welding head is mounted, an arm attached to said other shaft and extending through the opening in said hollow shaft, means for rotating said welding head about said hollow shaft in one plane of adjustment, means extending axially into said hollow shaft and acting on said arm for rotating said other shaft and the welding head supported thereon in a second plane of adjustment at right angles to said first mentioned plane of adjustment, chucks for supporting the complementary parts of a substantially closed vessel for rotation about a common axis with the seam between said parts opposite said welding head, means for operating said chucks to open and work holding positions, means for imparting rotation to at least one of said chucks, a tiltable bearing in one of said chucks axially aligned with the axis of rotation of said chucks, a bearing biased to a position in the axis of rotation of said chucks, a sleeve supported in said biased bearing, a shaft rotatable with said sleeve and supported for longitudinal movement in said tiltable bearing and said sleeve, said shaft having a curved end portion located between said chucks, a backing member supported on the end of the curved portion of said shaft, means for moving said chucks toward and away from one another, means responsive to the relative movement of said chucks for moving said shaft longitudinally to predetermined positions relative said chucks, an arm mounted on said sleeve, a stop engaging said arm when said shaft and sleeve is rotated until said backing member is positioned opposite the welding head, a second arm mounted on said sleeve and positioned relative to said first mentioned arm so that it is on one side of said biased bearing when said first mentioned arm is on the other side thereof in engagement with said stop, means for rotating said second arm about the axis of rotation of said shaft and said sleeve until said first mentioned arm engages said stop and thereafter for moving said bearing from its biased position to tilt said shaft and force said backing member into engagement with the work, means for supplying a combustible gaseous medium through said shaft to the work adjacent said backing means, and means for supplying a combustion supporting gas to the interior of said vessel.

JAMES T. CATLETT.
VERNI J. CHAPMAN.